March 10, 1964 A. W. CATE 3,124,180
MITERING GAGE FOR WORK TABLES
Filed March 23, 1961 3 Sheets-Sheet 1
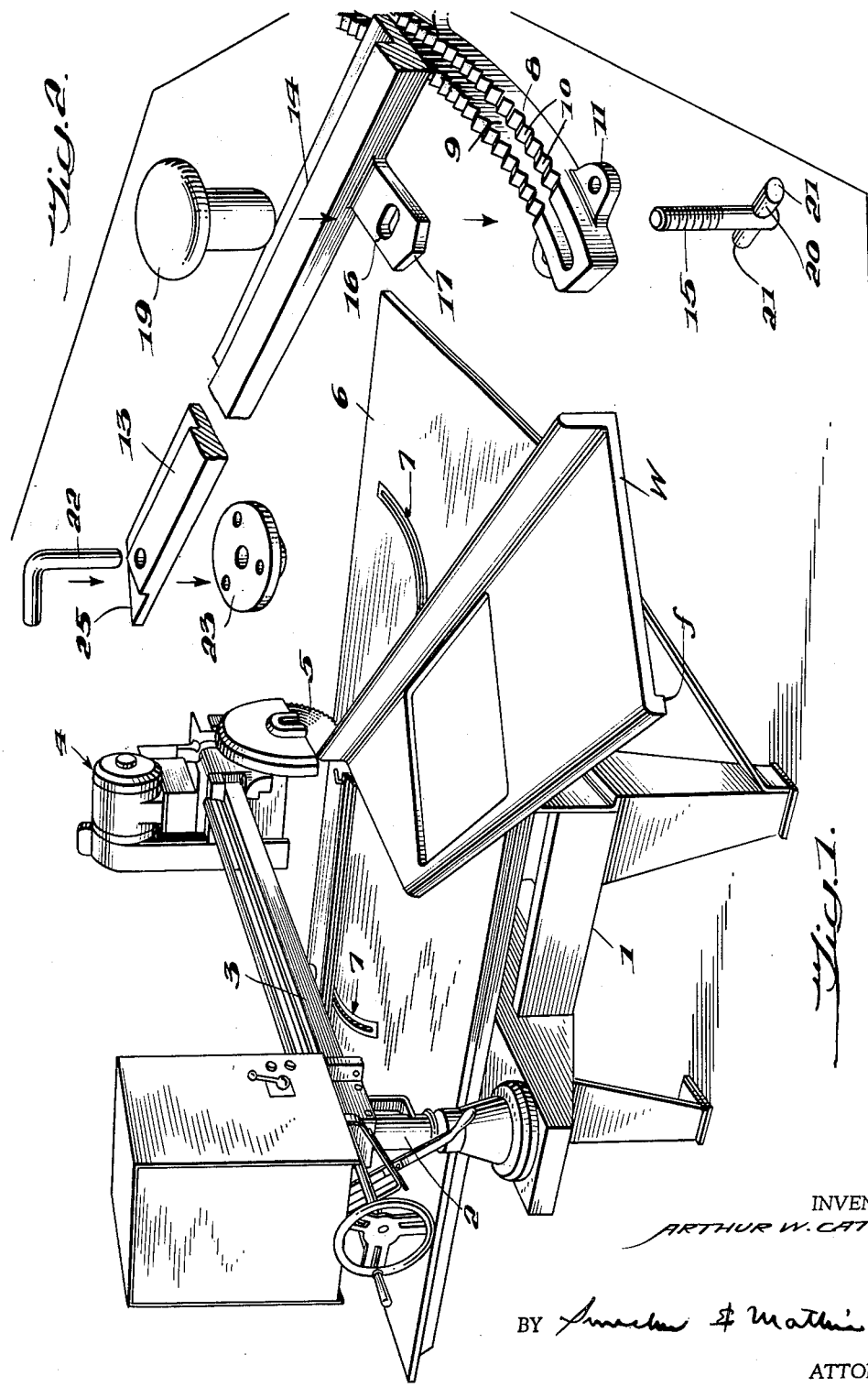
INVENTOR
ARTHUR W. CATE,
BY
ATTORNEYS March 10, 1964  A. W. CATE  3,124,180
MITERING GAGE FOR WORK TABLES
Filed March 23, 1961  3 Sheets-Sheet 2

INVENTOR
ARTHUR W. CATE,
BY
ATTORNEYS

March 10, 1964
A. W. CATE
3,124,180
MITERING GAGE FOR WORK TABLES
Filed March 23, 1961
3 Sheets-Sheet 3
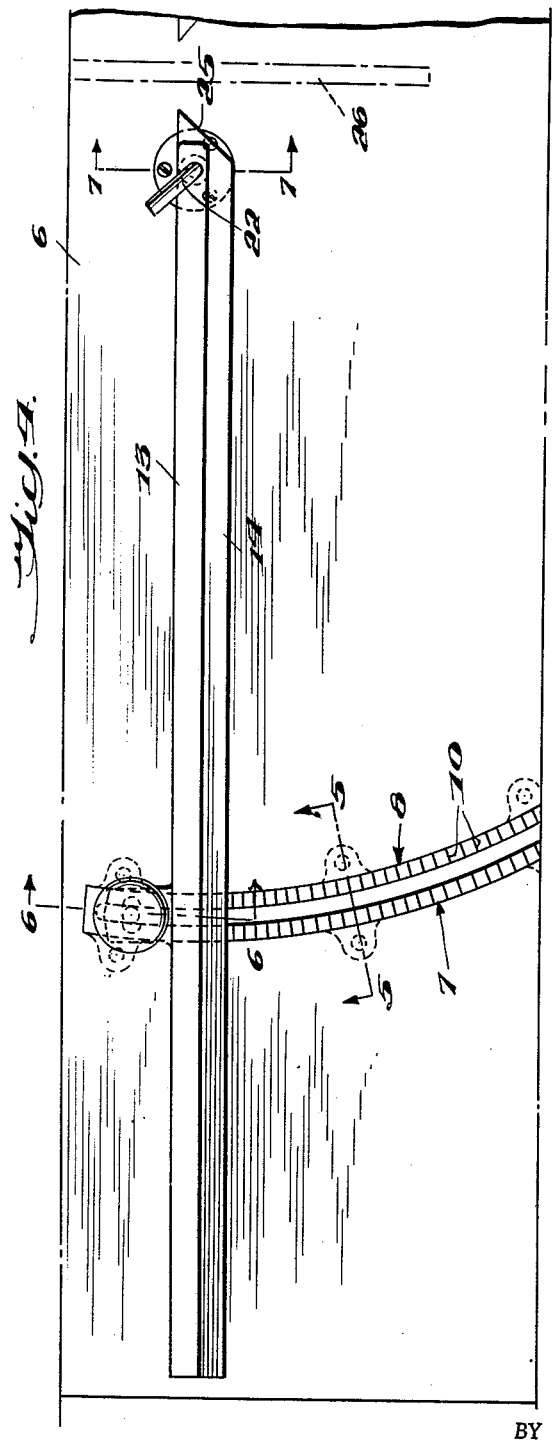
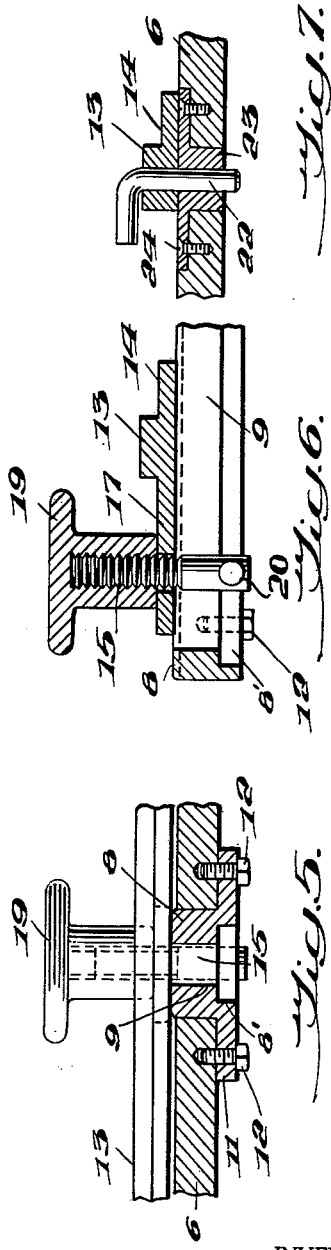
INVENTOR
ARTHUR W. CATE,
BY
ATTORNEYS United States Patent Office 3,124,180
Patented Mar. 10, 1964

3,124,180
MITERING GAGE FOR WORK TABLES
Arthur W. Cate, Knoxville, Tenn., assignor, by mesne assignments, to Tysaman Machine Company, Inc., Knoxville, Tenn., a corporation of Delaware
Filed Mar. 23, 1961, Ser. No. 97,782
3 Claims. (Cl. 143—169)

This invention relates to improvements in work tables of the character used for supporting sheets, formed members and other pieces of work upon which different operations may be performed, such, for example, as sawing or cutting operations.

It is desirable that provisions be made for shifting the position of the work with respect to the table surface and to provide a reasonable degree of accuracy in the holding of the pieces during operations thereon, as, for example, the sawing through the work. At the same time, the construction needs to be simple and inexpensive. No adequate provision has been made heretofore for accomplishing these results.

One object of this invention is to simplify and improve the construction of surfaces or tables, to enable these to be made inexpensively and yet effective for the purpose of holding the work in place during operations thereon.

Another object of the invention is to provide simple and inexpensive guide members which may be made without substantial cost and yet will provide a reasonable degree of accuracy in the location of the work on the table during operations thereon.

Still another object of the invention is to provide for an adjustable guide fence for locating the work in desired relation to the operation and which yet may be shifted to different positions with respect to the surface, to position the work in respectively different angles.

These objects may be accomplished, according to one embodiment of the invention, by locating in a work surface, such as a board, sheet or other table area, one or more quadrant sections disposed in desired relationship to the point of operation for holding a protractor guide fence against which the object may be held during the operation thereon. Both the protractor guide fence and the quadrant section may be constructed inexpensively and yet, when assembled, will provide good accuracy for the work without these parts being individually formed with a high degree of accuracy. Thus, castings may be used for the main parts and assembled in desired relations to the surface of the table, whereby the desired degree of accuracy thereof may be accomplished.

The parts preferably are mounted in a detachable relation to the surface of the table, so as to be separated and removed therefrom when desired. This will leave the working surface free and clear of any obstructions, to enable other operations to be performed thereon as may be found desirable.

This embodiment of the invention is illustrated in the accompanying drawings, in which:

FIG. 1 is a perspective view of a work table and saw assembly, and in which the invention is applied;

FIG. 2 is a disassembled perspective view of parts of the guide fence and quadrant members;

FIG. 4 is a similar view of one portion thereof on an enlarged scale;

FIG. 5 is a cross section through the quadrant member on the line 5—5 in FIG. 4;

FIG. 6 is a view at right angles thereto on the line 6—6 in FIG. 4; and

FIG. 7 is a detail cross section through the guide fence pivot, on the line 7—7 in FIG. 4.

Figure 3:
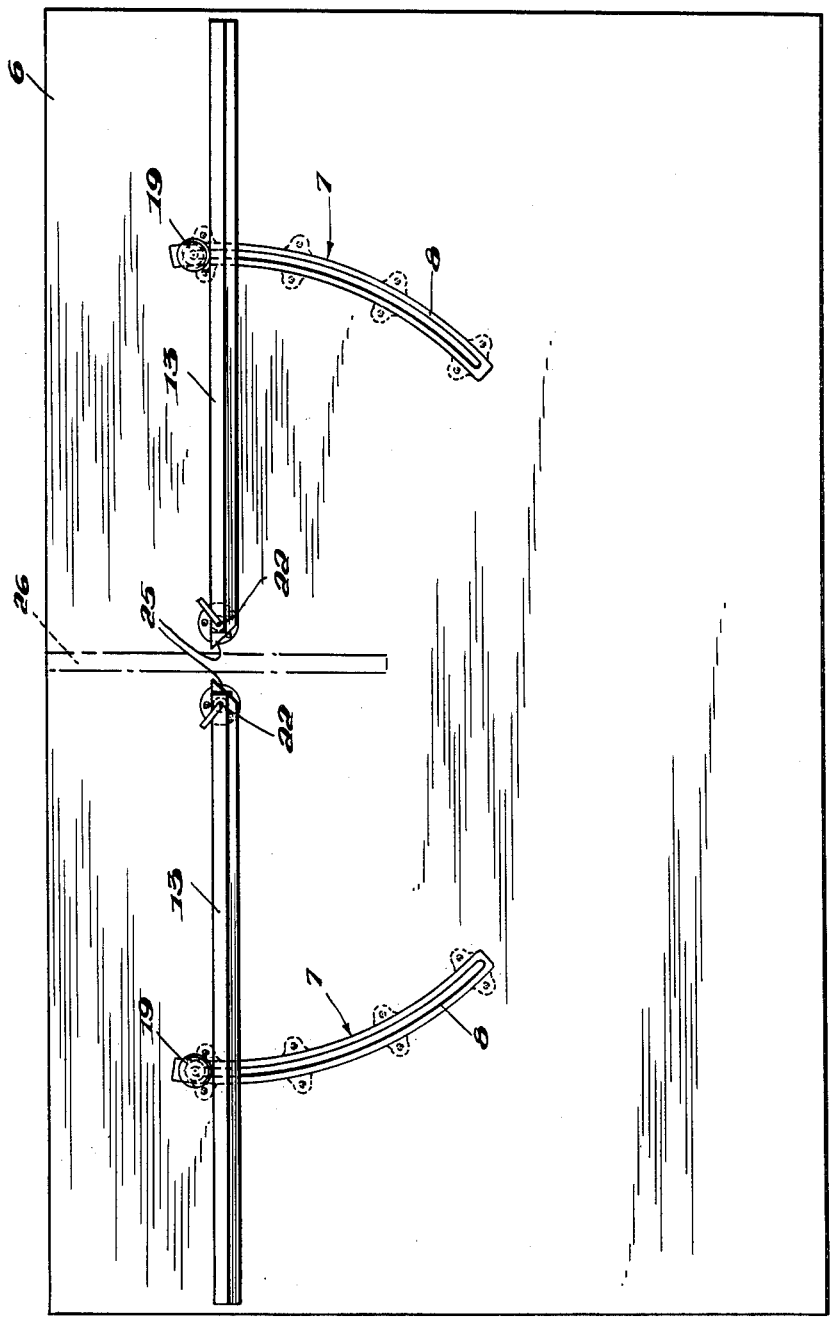
FIG. 3 is a top plan view of the work table.

The invention is shown applied to a saw frame merely as an embodiment and for the purpose of illustrating one use of the work table, but it will be understood that it may be used in many different applications as found desirable.

Referring to FIG. 1, the saw frame is illustrated generally at 1, having an upright standard 2 supported thereon from which a guide rail 3 projects outward over the work table or surface. A cutting assembly is illustrated generally at 4, having a power driven saw 5 adapted to be moved back and forth over the surface of the table.

Mounted on the saw frame 1 in this embodiment of the invention, in desirable relation to the point of operation, as, for example, the location of the saw 5, is a work table, generally illustrated 6. In this embodiment of the invention, the table 6 extends over a substantial area and preferably projects outward beyond the confines of the frame 1, so as to hold objects in place during operation thereon. The work table 6 may be made of any suitable material, such, for example, as plywood.

The table 6 is provided with suitable means on the top surface thereof for guiding the work in its proper relation to the center of operation. In this example, the work is generally indicated at W and may comprise a kitchen top or other large sheet which is adapted to be sawed at an angle to the length thereof. Also in this embodiment, the work W is shown as provided with a flange f along one edge thereof which rests on the surface of the table 6, with the major portion of the bottom surface of the work W spaced above the surface of the table.

Disposed in proper relation to the point of operation on the work is one or more cut-outs 7 formed as slots through the table top 6. One of these cut-outs is adapted to be provided for each quadrant member and guide fence to be used. In this embodiment 2, cut-outs 7 are provided, one adjacent each opposite end of the table top 6 and disposed in such relation thereto that the proper guiding action may be provided for the work.

Each quadrant section is indicated generally at 8 and is illustrated as extending through 45° relative to a center point. The quadrant section 8 may be formed as a casting, preferably of light-weight material, such as aluminum, with a slot 9 extending longitudinally of the quadrant section 8. The quadrant section preferably is formed with index graduations, indicated at 10 in FIG. 4, along each opposite edge of the slot 9 for proper and desired seating of the guiding member or fence hereinafter described. The graduations 10 are formed, preferably, by cutting the upper edges of the quadrant section 8, on opposite sides of the slot 9, in zigzag or serrated form. Thus, the lines of the graduations cannot wear off or become illegible.

The slot 9 extends throughout quadrant section 8, as illustrated in FIGS. 5 and 6, with a recessed or enlarged lower portion 8' of greater width than the main portion of the slot 9. The quadrant section 8 is provided with ears 11 spaced at intervals along the length thereof underlying the table top 6 and secured thereto by bolts or screws 12.

The guide means for the work provided on the top surface of the table 6 is shown in the form of a guide fence or elongated bar 13 which extends generally lengthwise of the table top 6 in crossed relation to the quadrant member 8. The guide fence 13 is shown as provided with a shoulder portion 14 along one edge thereof, so as to hold the main body of the work W spaced above the surface of the table 6 and to accommodate the flange f on the lateral edge of the work, thus forming a secure support for the work at both opposite edges. Where the work is entirely flat, the shoulder portion 14 is not required, or the work can abut directly against the outer lateral margin of the fence 13, rather than being seated on the shoulder.

The parts 8 and 13 may be secured together to hold the fence 13 in a set position with respect to the table. In this embodiment of the invention, the securing means comprises a bolt 15 extending upwardly through the quadrant section 8 and through a slot 16 formed in a flange 17 on one lateral edge of the fence 13. The upper end of the bolt 15 receives thereon a suitable clamping nut, such as a thumb nut 19. The lower end of the bolt 15 is provided with a cross pin 20 extending through a hole in the lower end of the bolt and fixed thereto. The pin 20 is of a length to extend in bridging relation substantially between opposite edges of the enlarged portion 9' of the slot 9. These opposite ends are cut off at angles of approximately 45° to the length of the pin 20, as illustrated at 21 in FIG. 2, with the bisected opposite ends reversed at the opposite ends of the pin. The length of the pin 20 is such that the bolt 15 may be rotated with respect to the enlarged slot 10 and turned so as to dispose the bisected ends 21 substantially flat against opposite sides of the slot 10. When in this position, the tightening of the thumb nut 19 will clamp the fence 13 securely to the quadrant section 8 and thereby hold the fence in its desired relation to the work table.

The opposite end of the fence 13 is adapted to be pivotally connected with the table top 6 concentric with the arc of the quadrant 8, as illustrated in FIGS. 4 and 7. A pivot pin is shown at 22 extending through a hole in the end of the fence 13 and downward through a guide bushing 23 inserted in the table top 6. The guide bushing preferably is recessed in the table top flush therewith and may be secured by suitable fastenings or screws 24. The pivot pin 22 is shown as L-shaped, so as to be dropped into place and capable of ready removal when separation of the parts is desired.

When the guide fence 13 is not required, this may be removed readily by disconnecting the bolt 15—19 and lifting out the pivot pin 22. After removal of these fastenings, the fence may be taken off, leaving the top of the table entirely free and clear, enabling other operations to be performed thereon or any desired use of the work surface.

Where two such guide fences are used, as shown in FIGS. 1 and 3, the adjacent ends of these may be bevelled off, as indicated at 25, so as to enable the pivot pins 22 to be located in close proximity to the center point of the working operation. A slot may be provided at 26, if needed, for accommodating the saw 5 or other tool operating on the work. In the event that the table top 6 is formed of plywood, the slot 26 can be formed by the saw 5 after assembly of parts, thereby readily locating the slot in proper relation to the saw.

The quadrant sections 8 and fence members 13 can be formed of suitable stock, as, for example, being cast of lightweight materials. No substantial degree of accuracy in the formation of these parts is required and yet assembled on the table top 6, a sufficient degree of accuracy is obtained so as to get an accurate location of the work W on the surface of the table.

The construction is simple and inexpensive to build and may be assembled and disassembled readily. When assembled, the parts form an effective guiding means for the work to dispose the latter in proper or required relation to the center of operation, as, for example, to the saw 5. Thus, a substantial improvement has been effected in work tables.

While the invention has been illustrated and described in one embodiment, it is recognized that other variations and changes may be made therein without departing from the invention as set forth in the claims.

I claim:

1. A work table of the character described comprising a table top having an arcuate slot therein, a quadrant member extending through the slot lengthwise thereof with a top surface substantially flush with the top surface of the table top, means for securing the quadrant member to the table top, said quadrant member having an elongated slot therein with a recessed underportion, serrations on the top surface of said quadrant member extending on each side of said elongated slot, the width of said arcuate slot being substantially equal to the combined widths of said elongated slot and said serrations, a fence member pivotally connected with the table top and extending in overlapping relation with the quadrant member, a clamp pin having operative connection with the fence member and extending downwardly through the slot in the quadrant member with a head portion received in the recessed portion of the slot and having means for bearing against opposite sides of the recessed portion of the slot for locking the fence member in place relative to the quadrant member.

2. A work table of the character described comprising a table top having an arcuate slot therein, a quadrant member extending through the slot lengthwise thereof with a top surface substantially flush with the top surface of the table top, means for securing the quadrant member to the bottom of the table top, said quadrant member having an elongated slot therein with a recessed underportion, a fence member pivotally connected with the table top and extending in overlapping relation with the quadrant member, a clamp pin having operative connection with the fence member and extending downwardly through the slot in the quadrant member, and a cross pin extending substantially at right angles to the clamp pin at the lower end thereof, said cross pin having opposite ends bevelled at acute angles to the length thereof whereby upon rotation of the clamp pin the bevelled ends fit substantially flat against opposite sides of the recessed portion of the slot and cooperate with the clamp pin to hold the fence member in place relative to the quadrant member.

3. A work table of the character described comprising a table top having an arcuate slot and an aperture therein, a bushing extending through said aperture and secured to said table top, a quadrant member extending through the slot lengthwise thereof with a top surface substantially flush with the top surface of the table top, ears extending laterally from the bottom of said quadrant member for securing the quadrant to the bottom of the table top, said quadrant member having an elongated slot therein with a recessed under portion, the top surface of said quadrant member being provided with serrations to form index graduations, a fence member having a recess extending longitudinally along one side thereof to form a pair of guide surfaces, said fence member having a bore therethrough adjacent one end thereof, a pivot pin slidably extending through said bore into said bushing to connect pivotally said fence member to said table top, a clamp pin having operative connection with the fence member and extending downwardly through the slot in the quadrant member, a cross pin extending substantially at right angles to the clamp pin at the lower end thereof, and said cross pin having opposite ends bevelled at acute angles to the length thereof whereby upon rotation of the clamp pin the bevelled ends fit substantially flat against opposite sides of the recessed portion of the slot and cooperate with the clamp pin to hold the fence member in place relative to the quadrant member.

References Cited in the file of this patent

UNITED STATES PATENTS

| | | |
|---|---|---|
| 128,063 | King | July 16, 1872 |
| 140,267 | Green | June 24, 1873 |
| 327,651 | Bradshaw | Oct. 6, 1885 |
| 420,739 | Schmitz | Feb. 4, 1890 |
| 2,680,458 | Grammer | June 8, 1954 |